US006473984B1

(12) United States Patent
Splain et al.

(10) Patent No.: US 6,473,984 B1
(45) Date of Patent: Nov. 5, 2002

(54) PLANOGRAM MEASURING DEVICE

(75) Inventors: William D. Splain, Brooklyn Park, MN (US); James C. Bowser, Victoria, MN (US); Noreen E. O'Neil, Golden Valley, MN (US); Patricia A. Bredow, White Bear Township, MN (US); Douglas G. Prideaux, Eden Prairie, MN (US); Andrew P. Vigneau, Oro Valley, AZ (US)

(73) Assignee: Target Brands, Inc., Minneapolis, MN (US)

( * ) Notice: Subject to any disclaimer, the term of this patent is extended or adjusted under 35 U.S.C. 154(b) by 0 days.

(21) Appl. No.: 09/519,074

(22) Filed: Mar. 6, 2000

(51) Int. Cl.[7] ........................... G01D 21/00; G01B 3/10
(52) U.S. Cl. ........................................... 33/613; 33/760
(58) Field of Search ................... 33/41.1, 41.6, 33/760, 528, 533, 613, 644, 645, 452, 464

(56) References Cited

U.S. PATENT DOCUMENTS

| | | | |
|---|---|---|---|
| 174,471 A | | 3/1876 | Bryant |
| 2,192,679 A | | 3/1940 | Kimball ..................... 40/19.5 |
| 2,608,012 A | | 8/1952 | Jackson ....................... 40/124 |
| 3,126,645 A | | 3/1964 | Lloyd ............................. 35/7 |
| 3,145,475 A | * | 8/1964 | Alford ......................... 33/41.1 |
| 3,173,217 A | | 3/1965 | Schultz ............................ 35/8 |
| 4,245,414 A | | 1/1981 | Shypula ....................... 40/124 |
| 4,503,618 A | * | 3/1985 | Ederhardt .................... 33/645 |
| 4,788,784 A | | 12/1988 | Templin ...................... 40/657 |
| 5,092,057 A | * | 3/1992 | Hoenig, Sr. ................. 33/760 |
| 5,179,787 A | * | 1/1993 | Ostrowski .................... 33/528 |
| 5,246,253 A | | 9/1993 | Mykrantz ................... 283/117 |
| 5,357,683 A | * | 10/1994 | Trevino ....................... 33/528 |
| 5,387,011 A | | 2/1995 | Freund ......................... 283/61 |
| 5,390,425 A | * | 2/1995 | Gilberts ....................... 33/760 |
| 5,392,524 A | * | 2/1995 | Hill ............................. 33/645 |
| 5,442,866 A | * | 8/1995 | Woods .......................... 33/70 |
| 5,797,755 A | | 8/1998 | Montgomery ............... 434/429 |
| 5,810,395 A | | 9/1998 | Morgan ....................... 283/70 |
| 5,933,975 A | * | 8/1999 | Pate ............................ 33/645 |
| 6,082,019 A | * | 7/2000 | Lapp et al. ................... 33/760 |
| 6,173,505 B1 | * | 1/2001 | Munno ......................... 33/760 |

* cited by examiner

Primary Examiner—Diego Gutierrez
Assistant Examiner—Madeline Gonzalez
(74) Attorney, Agent, or Firm—Faegre & Benson LLP

(57) ABSTRACT

A method of positioning a product on a display. The method including the steps of defining an indicia row associated with the display, defining an indicia column associated with the display, providing a product coordinates set specifying an intended position of the product on the display, and locating the product on the display using the positioning coordinates set at a location corresponding to the product coordinates set.

31 Claims, 6 Drawing Sheets

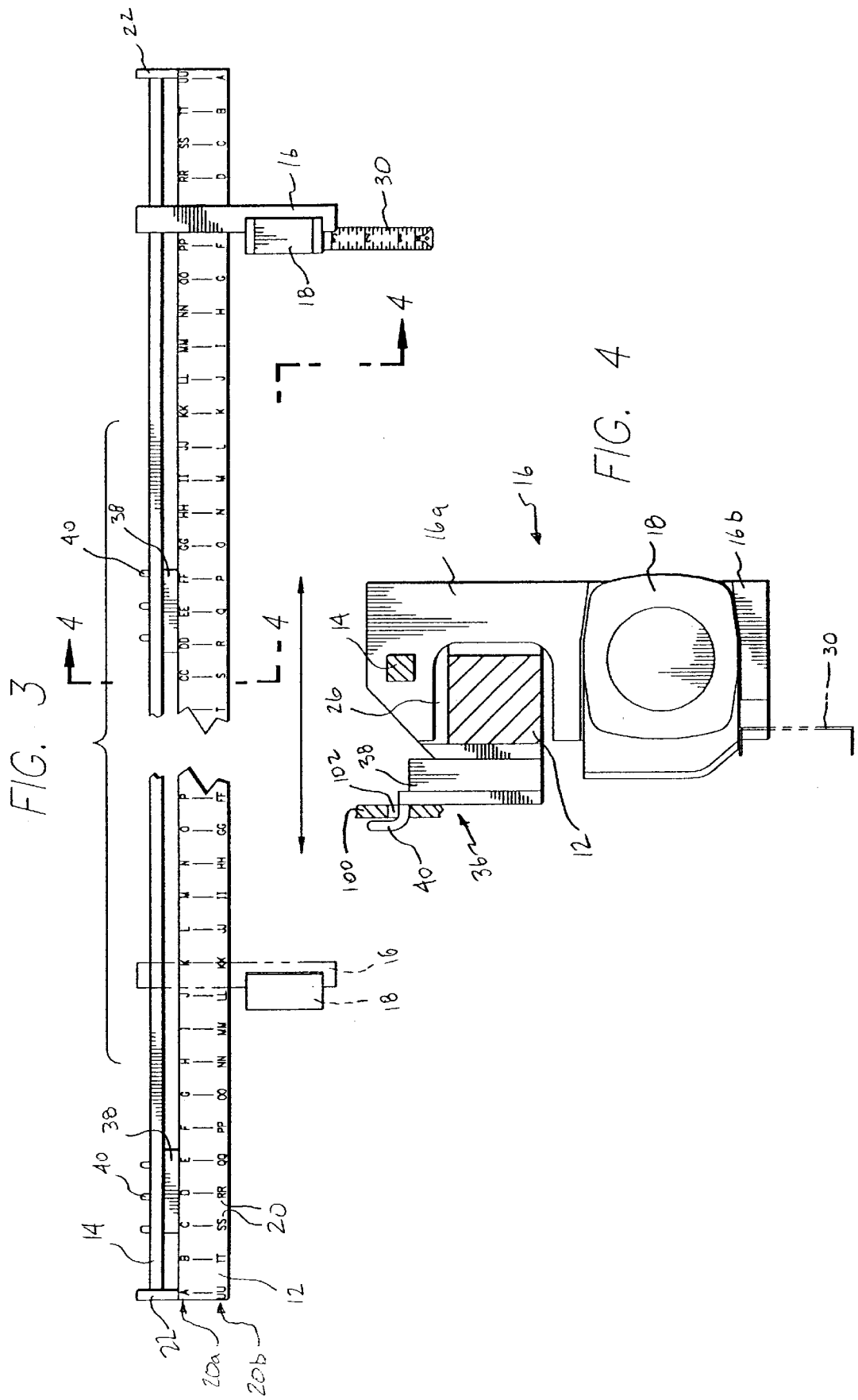

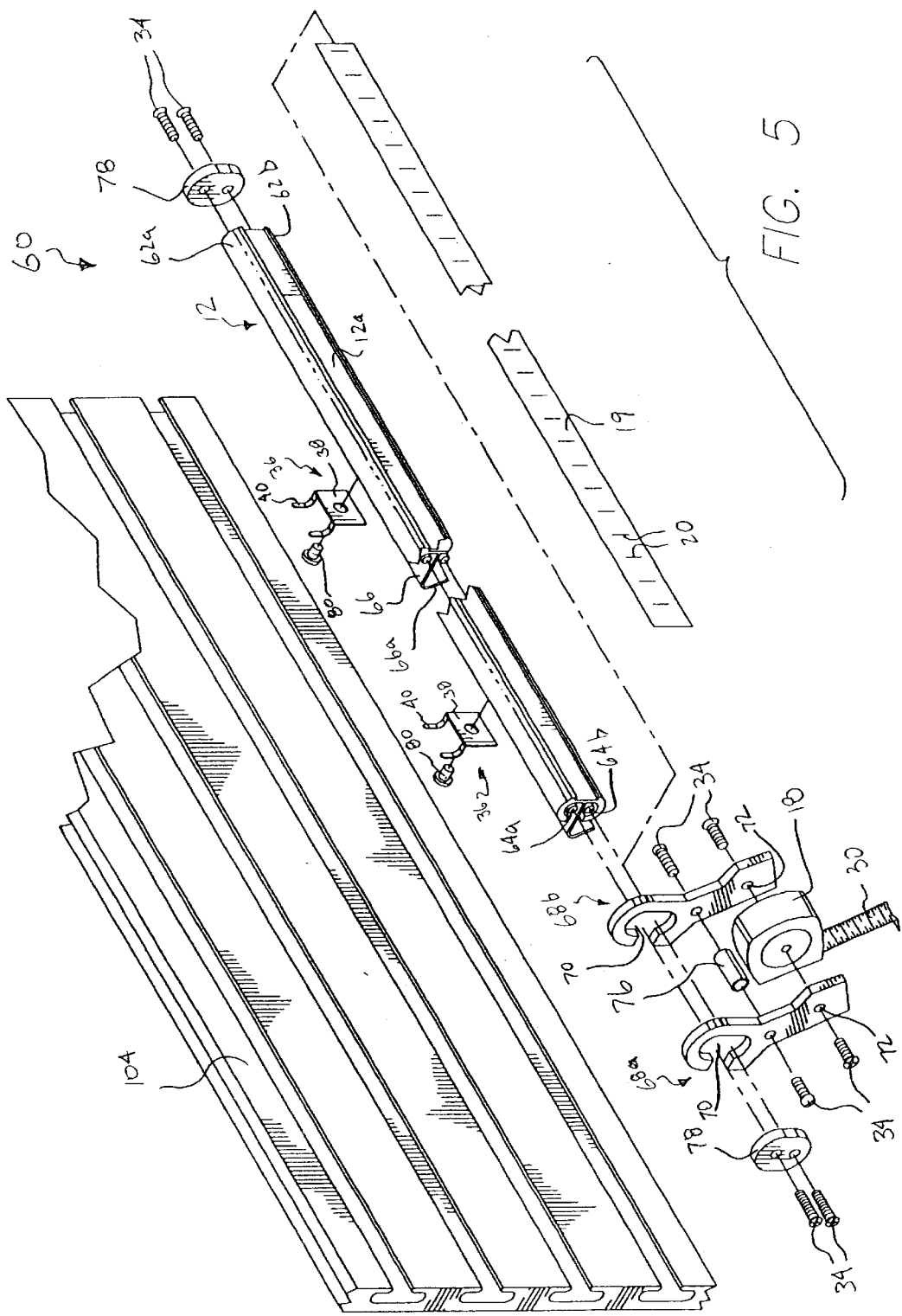

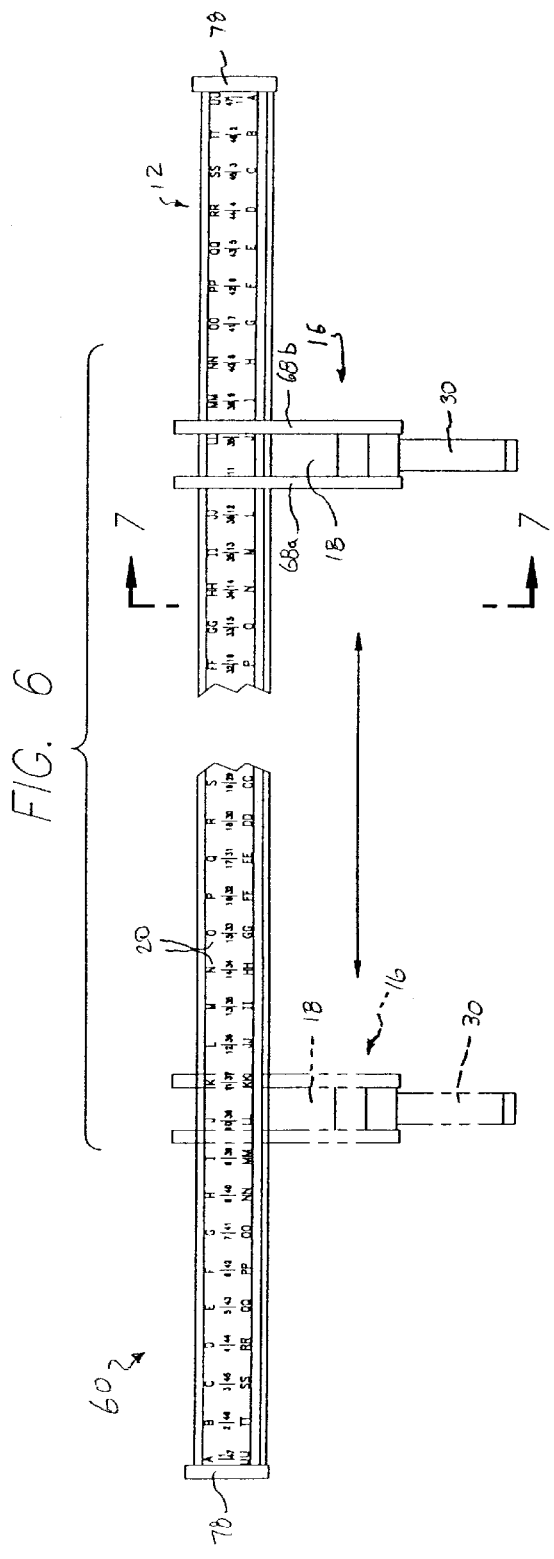
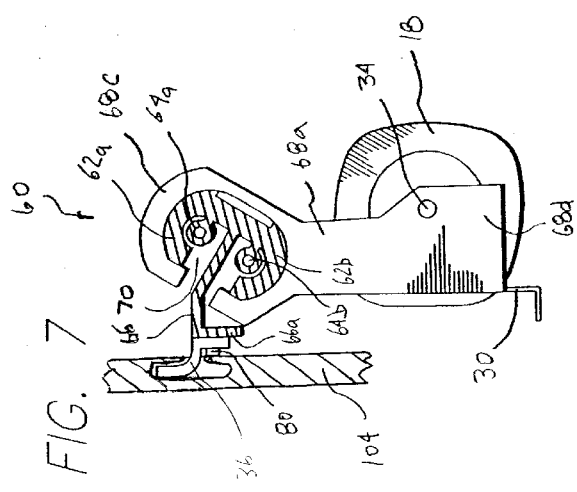

PLANOGRAM MEASURING DEVICE

FIELD OF THE INVENTION

The present invention relates to a device for setting product planograms in a retail store or the like.

BACKGROUND OF THE INVENTION

Retail stores such as a department store have a limited amount of space in which to display products or present them for sale. Many products are presented for sale by hanging them on display support members such as display hooks, pegs, arms and the like that are affixed to a perforated board or pegboard containing a plurality of apertures. The display support members are capable of being securely mounted within the apertures and can support salable goods in selected positions on the board for display purposes. The apertures are arranged on the perforated board in a plurality of rows and columns. It is advantageous to arrange the various display support members to maximize the space wherein products are presented for sale. Arranging the salable products on a perforated board in a neat and orderly fashion wherein space is maximized is a time-consuming process that requires skill and merchandising knowledge. A chain of stores can save time and money by having a merchandising expert at a central location determine the layout for a planogram, and then send the coordinates to the individual stores, thereby allowing employees at the separate stores to place the salable products.

There are prior art devices for arranging display support members on perforated boards. For example, U.S. Pat. No. 4,788,784 to Templin discloses a removable adhesive display sheet which, when mounted onto a perforated board, provides a display system for arranging and displaying salable goods to customers. The sheet includes apertures that align with the apertures in the board when the sheet is adhered to the board. The sheet includes display indicia, such as descriptive indicia or pictorial indicia, thereon. However, this system has many drawbacks. When adhering the sheet to the perforated board it is difficult to align the apertures. Also, it is time consuming to manufacture the sheet with the display indicia thereon. Furthermore, the pictorial indicia must be specific to certain salable items.

A long felt need exists for a system for arranging salable items and the corresponding display support members on a perforated board that is simple and overcomes the drawbacks of the prior art.

SUMMARY OF THE PREFERRED EMBODIMENTS

In accordance with one aspect of the present invention there is provided a method for positioning a product on a display. The method includes the steps of defining an indicia row associated with the display, defining an indicia column associated with the display, providing a product coordinates set specifying an intended position of the product on the display, and locating the product on the display using the positioning coordinates set at a location corresponding to the product coordinates set. A column indicia and a row indicia form a set of coordinates. In a preferred embodiment, the method includes the additional step of sliding the indicia column relative to the indicia row.

In accordance with another aspect of the present invention there is provided a system for facilitating the positioning of at least one product on a display. The system includes a coordinate indicia row associated with the display, and a coordinate indicia column associated with the display. The coordinate indicia row and the coordinate indicia column cooperate to define at least one product coordinates set at a point on the display where the product is to be positioned. In a preferred embodiment of the invention, the display is a perforated board, and the indicia column is slidable relative to the indicia row.

In accordance with yet another aspect of the present invention there is provided a device for facilitating the positioning of a product on a display. The device includes a first horizontal member adapted to removably engage the display, said horizontal member including coordinate indicia thereon, and a coordinate member associated with the horizontal member. A coordinate from the first horizontal member and a coordinate from the coordinate member form a product coordinates set for facilitating positioning of a product on the display. In a preferred embodiment of the present invention the display is a perforated board and the coordinate member is a tape measure. In another preferred embodiment of the invention the device includes a carriage that is slidable relative to the first horizontal member.

In accordance with yet another aspect of the present invention there is provided a merchandising device comprising a coordinate system that includes first and second coordinate sets. The first coordinate set includes a plurality of alphabetical, numeric or alphanumeric elements that progress alphabetically, numerically or alphanumerically in a first direction and the second coordinate set includes substantially the same elements as the first coordinate set. The elements of the second coordinate set progress in a second direction that is substantially opposite to the first direction.

Other objects, features and advantages of the present invention will become apparent to those skilled in the art from the following detailed description. It is to be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The invention may be more readily understood by referring to the accompanying drawings in which

FIG. 3 is a front elevational view of the device of FIG. 1.

FIG. 4 is a sectional side view showing the details of the carriage taken along line 4—4 of FIG. 3.

FIG. 5 is an exploded perspective view of a planogram measuring device in accordance with a second embodiment of the present invention.

FIG. 6 is a front elevational view of the device of FIG. 5.

FIG. 7 is a sectional side view showing the details of the carriage taken along line 7—7 of FIG. 6.

Like numerals refer to like parts throughout the several views of the drawings.

DETAILED DESCRIPTION OF THE PREFERRED EMBODIMENTS

With reference generally to FIGS. 1–4, a first embodiment of a planogram measuring device 10 is shown. The planogram measuring device 10 generally includes first and second horizontal members 12, 14, a carriage 16 and a coordinate member 18. It will be appreciated that terms such as "front," "back," "vertical," "horizontal," "row," "column," "upper," "lower," "left," "right," "top" and "downwardly" used hereinbelow are used merely for ease of description and refer to the orientation of the components as shown in the Figures. It should be understood that any orientation of the planogram measuring device described herein is within the scope of the present invention.

Figure 1:
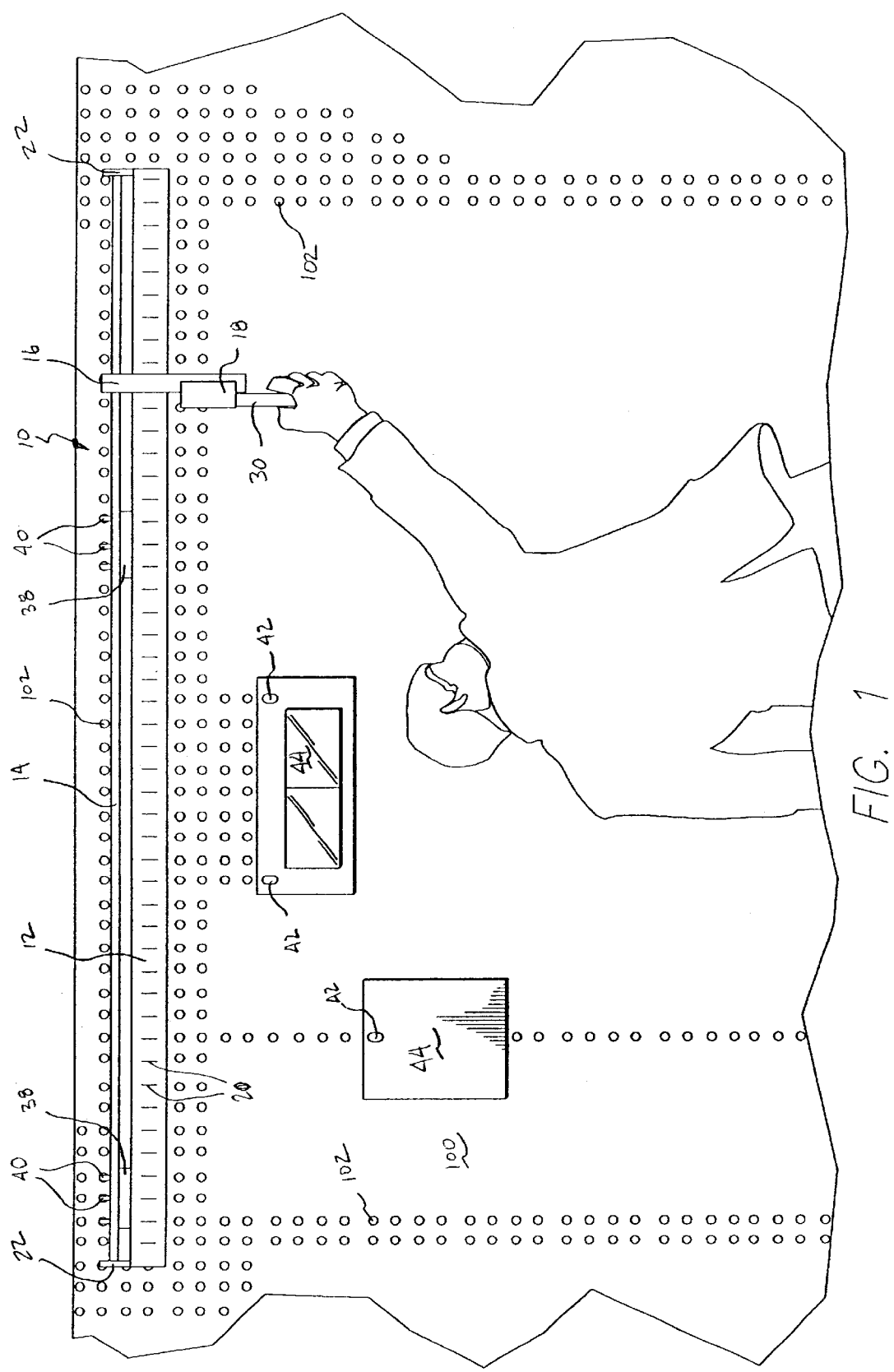
FIG. 1 is a perspective view of a planogram measuring device affixed to a perforated board in accordance with a first embodiment of the present invention.
Figure 2:
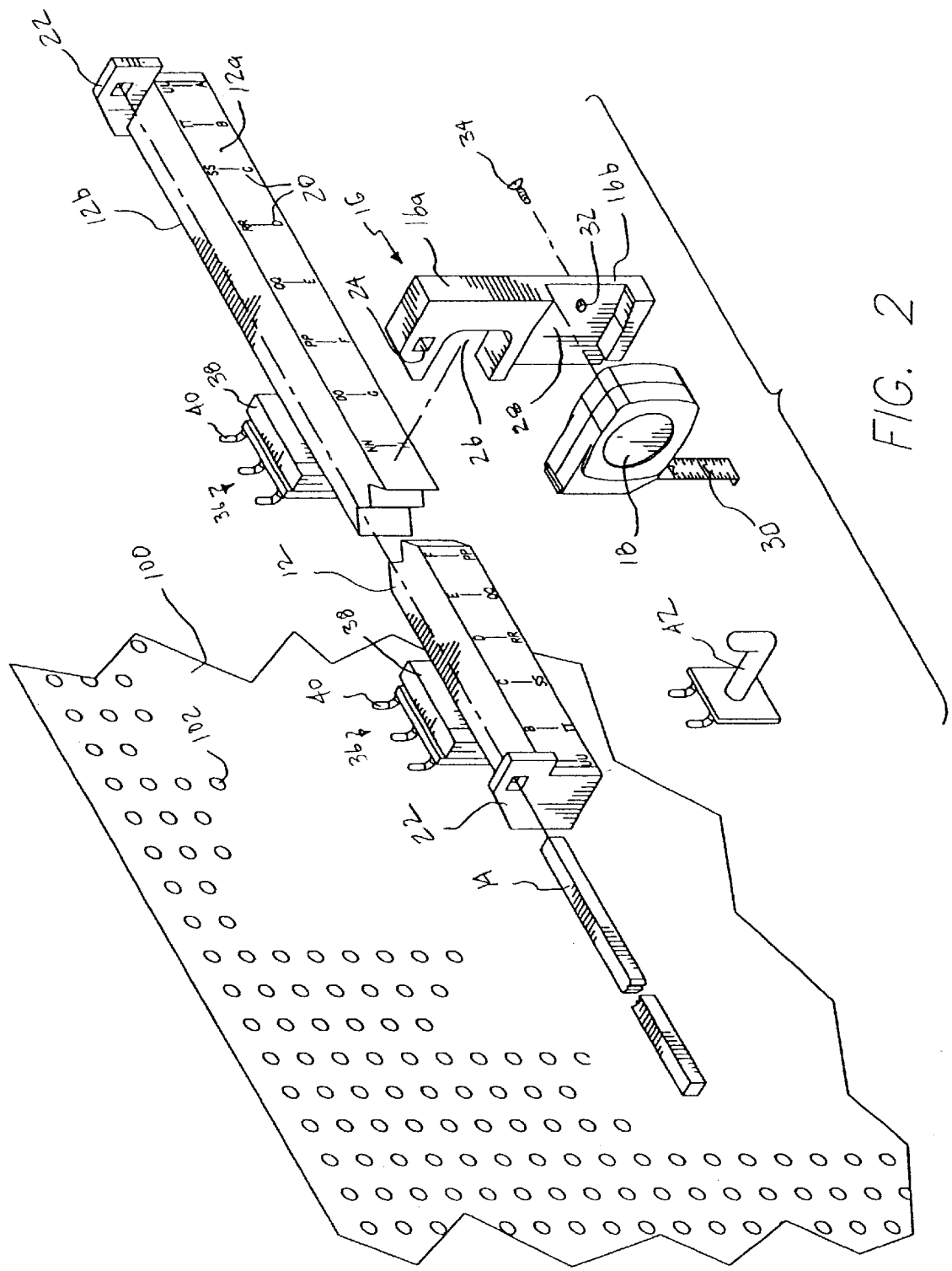
FIG. 2 is an exploded perspective view of the various elements of the device of FIG. 1.

A planogram is a set of instructions or product placement coordinates that instruct or direct a person, such as a store employee, how to display products, signs, accessories or the like. As shown in FIGS. 1 and 2, typically, a planogram is arranged on a merchandise panel or similar display. The display can be a pegboard or other perforated board (as shown in FIGS. 1 and 2), a wire grid merchandising panel, a slatwall/slotwall (as shown in FIG. 5) merchandising panel or any other display panel known in the merchandising art. As described herein, the planogram measuring device 10 is used to set a planogram on a perforated board 100 that includes a plurality of apertures 102 defined therein, however, it will be understood that this is not a limitation on the present invention. The display can also be a board with Velcro® thereon or a board with hooks permanently secured thereto or the like. The planogram measuring device 10 can be used to set planograms on any size merchandising panel, for example, a typical panel, which is 4 feet across, or an endcap, which is 3 feet across.

As described above, the apertures 102 are arranged on the perforated board 100 in a plurality of rows and columns that are substantially parallel to one another. A typical perforated board 100 has horizontal rows of apertures 102 spaced apart at a vertical distance measured from the respective center of the respective apertures 102 in adjacent rows of about one inch. Similarly, the vertical columns of apertures 102 are generally spaced apart at a horizontal distance measured from the respective centers of the respective apertures 102 in the perforated board 100. All the apertures 102 in the perforated board 100 are substantially the same diameter, generally from about ⅛ inch up to about ¼ inch. It will be understood that the apertures 102 in the perforated board 100 can be any diameter.

The first horizontal member 12 includes front and back surfaces 12a, 12b. Preferably, on the front surface 12a is a plurality of coordinate indicia 20 at predetermined spaced apart intervals. The coordinate indicia 20 are preferably alphanumeric, however they can be any type of numbers, letters, symbols, etc. or multiples or combinations thereof. The coordinate indicia 20 are individually spaced apart such that when the planogram measuring device 10 is affixed to the perforated board 100 (as described below), the coordinate indicia 20 (or a set thereof) are each aligned with a column of apertures 102. To accomplish this, the coordinate indicia 20 are placed at predetermined spaced apart intervals to match the spaced apart columns of apertures 102. As described above, this interval is typically standard, which for a perforated board or pegboard is one inch. In another embodiment, the first horizontal member 12 may have a plurality of sets of coordinate indicia 20 to correspond to differently dimensioned perforated boards. It will be understood that the coordinate indicia can also be located on the top or bottom surfaces of the first horizontal member 12.

Figure 8:
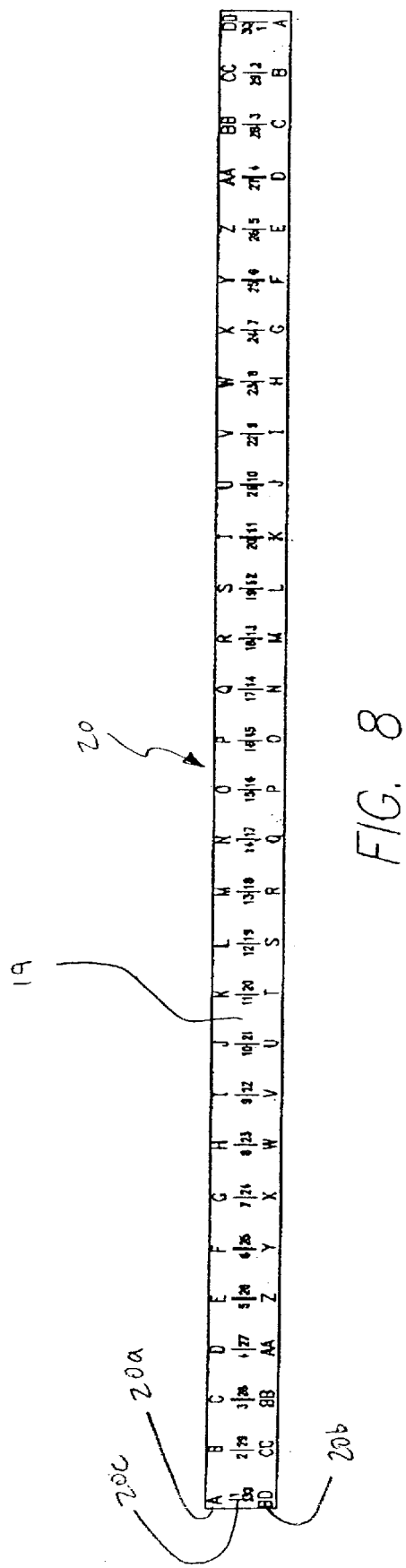
FIG. 8 is a front elevation of the coordinate strip including a plurality of indicia rows thereon in accordance with the present invention.

Referring to FIGS. 2, 3 and 8, in a preferred embodiment, the coordinate indicia 20 is arranged so that there are a plurality of rows of numeric, alphabetical or alpha-numeric coordinate indicia, such that a planogram can be set by reading the coordinate indicia 20 from the left or from the right. As shown in FIG. 3, a first coordinate indicia row 20a begins with the letter "A" (it will be understood that the first coordinate indicia row 20a can begin with any desired letter or number, etc.) on the left side of the first horizontal member 12, and a second coordinate indicia row 20b begins with the letter "A" (or same starting letter as the first row 20a) from the right side of the first horizontal member 12. This is referred to as left lead-in or right lead-in. It will be understood that coordinate indicia rows employing numbers and that use the left lead-in, right lead-in idea can be provided as well. As shown in FIG. 8, a coordinate indicia row 20c can also include left lead-in and right lead-in coordinates in a single row. Typically, an operator would read the coordinates from the left to the right. Therefore, when a vertical coordinate is "k", the operator begins with the carriage 16 at the left end of the device and using the first indicia row 20a and slides the carriage 16 until it corresponds to "k". This is left lead-in. For right lead-in, the operator performs the same steps, but begins at the right end of the device and uses the second coordinate indicia row 20b.

The coordinate indicia rows create a coordinate system, as shown in FIG. 8. It will be understood that each coordinate indicia row comprises at least one coordinate set (or two coordinate sets, as is the case with row 20c) that is made up of a plurality of alphabetical, numeric or alphanumeric elements that progress alphabetically, numerically or alphanumerically in a direction. As shown in FIG. 8, the first coordinate indicia row 20a defines a first coordinate set and the second coordinate indicia row 20b defines a second coordinate set. The second coordinate set comprises substantially the same elements as the first coordinate set. The elements of the second coordinate set progress in a direction substantially opposite of the elements in the first coordinate set. Progress is used herein as meaning that alphabetical sets increase in alphabetical order in a typical manner, e.g., A, B, C, D, E . . . , numerical sets increase in a typical manner, e.g., 1, 2, 3, 4, 5 . . . and alphanumeric sets increase in a manner as would be understood by a skilled artisan, e.g., A1, A2, A3, B1, B2, B3 . . . . It will be understood that the creator of the coordinate system can define a set that progresses in any desired fashion, provided that the first and second coordinate sets progress in substantially the same manner in their opposite directions.

In the first embodiment, flanges 22 extend upwardly from the opposite ends of the first horizontal member 12. The second horizontal member 14 is secured between the flanges 22 and spaced above the first horizontal member 12. Preferably, the first and second horizontal members 12, 14 are made of a durable material, such as aluminum, plastic or the like and are rectangular along their transverse cross-section. However, it will be understood that first and second horizontal members 12, 14 can have a transverse cross-section of any shape.

Carriage 16 includes an upper portion 16a and a lower portion 16b. Upper portion 16a includes an opening 24 through which the second horizontal member 14 extends and a first recess 26 through which the first horizontal member 12 at least partially extends. Lower portion 16b extends below the first horizontal member 12 and includes a second recess 28 in which coordinate member 18 is secured, as best shown in FIG. 5. Opening 24 and first recess 26 are spaced apart such that in operation, carriage 16 can slide along the second horizontal member 14 and not contact first horizontal member 12. In another embodiment, carriage 16 may contact the first horizontal member, or may include ball bearings or the like for allowing carriage 16 to slide relative to the horizontal members (or just the first horizontal member 12) more easily. It will be understood that first recess 26 can completely surround the first horizontal member 12, however, in a preferred embodiment it does not, such that when the planogram measuring device 10 is affixed to a perforated board 100 the carriage 16 does not contact the board 100. Coordinate member 18 also includes coordinate indicia 20 at predetermined, spaced-apart intervals. Preferably, the coordinate indicia 20 is located on an extendable coordinate portion 30. In a preferred embodiment, the coordinate member 18 is a tape measure as is well known in the art, and the coordinate indicia 20 are units of measurement (inches, centimeters, etc.). The coordinate member 18 can be secured within recess 28 by any known method. For example, lower portion 16b can include at least one threaded opening 32 through which a threaded fastener 34, such as a screw, is threaded, as shown in FIG. 2. Coordinate member 18 can also be secured in place by adhesive, tape, welding or the like.

In the first embodiment, the planogram measuring device 10 includes means for being secured or removably affixed to the perforated board 10. This can include hooks, clamps, pegs, magnets, adhesive or any other means for securing known in the art. Preferably, the planogram measuring device includes securing members 36 for engaging some of the apertures 102 in the perforated board 100 (or the slots in a slotwall, or the openings in a wire grid merchandising panel) and securing the planogram measuring device thereto. As shown in FIG. 4, the securing members 36 include a base portion 38 that is fixedly secured to the back surface 12b of the first horizontal member 12 and at least one peg or hook portion 40. The peg portions 40 are sized to snugly engage apertures 102. As shown in FIG. 2, the planogram measuring device 10 includes three spaced apart securing members 36. However, it will be understood that any number of securing members 36 is within the scope of the present invention.

It will be understood that in operation an operator can use the planogram measuring device for two purposes, determining the coordinates where display support members 42 and/or products 44 will be placed, and placing display support members 42 and/or products 44 in the correct position with predetermined product placement coordinates that have been provided to the operator. Referring to FIG. 1, in operation, the peg portions 40 of the securing members are engaged with apertures 102 on the perforated board 100 such that the first and second horizontal members 12, 14 are substantially horizontally oriented and located near the top of perforated board 100 (it will be understood that the planogram measuring device 10 can operate from any point on the display), thereby defining an indicia row. The extendable coordinate portion 30 is then extended downwardly to the lowest to row of apertures on the perforated board 100, thereby defining an indicia column. If, for example, a display support member 42 is to be secured in an aperture at display support position mark AA×23", the carriage 16 is slid relative to the first horizontal member 12, until the left edge of the carriage 16 is aligned with the coordinate indicia 20 marked AA. The planogram measuring device 10 may be designed such that the right edge, or a mark disposed between the left and right edges of the carriage 16, is aligned with the column of apertures 102. The operator then locates 23" on the extendable coordinate portion. The aperture 102 that corresponds to 23" on the extendable coordinate portion 30 is where the display support member 42 is inserted (and the product 44 is then placed). It will be understood that a display support member often has two arms or the like that are inserted into adjacent apertures 102. Therefore, the information will be provided to the operator regarding which arm (for example, left or right) should be inserted into the identified aperture 102. This process can be repeated as desired. In an alternative embodiment, the extendable coordinate portion can be extended downwardly each time a coordinate in the indicia column is to be located.

Referring to FIGS. 5–7, a second embodiment of a planogram measuring device 60 is shown. The second embodiment 60 is similar to the first embodiment 10, therefore, similar parts are numbered with like numerals. The planogram measuring device 60 is shown being used with a slatwall 104, however, it will be understood that it can be used with any display panel. In the second embodiment of the planogram measuring device 60, the second horizontal member is omitted. The first horizontal member 12 includes opposed arcuate sections 62a, 62b that surround a pair of screw receiving members 64a, 64b, as shown in FIG. 7. The first horizontal member 12 also includes an angled connection member 66 extending rearwardly therefrom (the purpose of the angle will be described below). The first horizontal member 12 includes coordinate indicia 20 on the front surface 12a thereof. The coordinate indicia 20 can be printed on a coordinate strip 19, as shown in FIG. 5, that is adhered to front surface 12a.

The carriage 16 includes a pair of side members 68a, 68b that each include an upper portion 68c having an opening 70 defined therein that is sized to receive the first horizontal member 12. The side members 68a, 68b also include a lower portion 68d that extends downwardly when the carriage 16 is engaged with the first horizontal member 12. At least one opening 72 is defined in the lower portion 68d of each of the side members 68a, 68b for receiving a threaded member 34 for mounting the coordinate member 18. A spacer member 76 can also be used for helping space apart the two side members 68a, 68b.

Once the carriage 16 is placed on the first horizontal member 12, a pair of end members 78 are secured to the end thereof to prevent the carriage 16 from sliding off. Preferably, end members 78 are secured on the ends of first horizontal member 12 using threaded members 34 that engage the screw receiving members 64a, 64b. A plurality of securing members 36 are affixed to the downwardly extending portion 66a of the angled connection member 66 by any known method (rivets 80 are shown in FIG. 5). The angled connection member 66 is angled such that when the securing members 36 are engaged with a display panel the carriage 16 hangs generally downwardly, as shown in FIG. 7, and the front surface 12a of the first horizontal member 12 (which typically includes the coordinate indicia 20) is angled downwardly, thereby making reading of the coordinate indicia 20 easier for the operator when the device 60 is placed near the top of a display panel. It will be understood that the device 60 can be constructed so that the front surface 12a of the first horizontal member 12 is not angled downwardly.

It will be understood that the use of the planogram measuring device with a perforated board or a slatwall is not a limitation on the present invention. As discussed above, the planogram measuring device 10 can be used for determining coordinates on any display surface, such as a chalkboard, bulletin board, etc. It will be further understood that other embodiments are within the scope of the present invention. For example, the coordinate system may include a vertically oriented strip and a horizontally oriented strip (made of cloth, cellophane, plastic or the like) that are affixed or removably affixed to the perforated board at or near its borders, thereby allowing an operator to find a set of product coordinates by identifying a row associated with a coordinate indicia on the vertically oriented strip and identifying a column associated with a coordinate indicia on the horizontally oriented strip and determining where the row and column intersect. There may also be more than one vertically and/or horizontally oriented strip.

The embodiments of the present invention recited herein are intended to be merely exemplary and those skilled in the art will be able to make numerous modifications to them without departing from the spirit of the present invention. For example, the components for allowing the carriage 16 to slide relative to the first horizontal member 12 can be modified. The end flanges 22 can be eliminated. The extendable tape measure can be replaced by a measuring stick, ruler or nonextendable tape measure. The planogram measuring device may be secured to the merchandise display panel such that it is vertically oriented, and the tape measure is extendable horizontally. The indicia row and indicia column could be defined by magnetic or adhesive strips secured to the display or merchandise panel. A projector could be used to project an indicia row and indicia column onto the display or merchandise panel. The carriage 16 may be secured relative to the first horizontal member 12. All such modifications are intended to be within the scope of the present invention as defined by the claims appended hereto.

What is claimed is:

1. A method for positioning a product on a merchandise display, the method comprising the steps of:
    removably attaching an indicia row to the merchandise display;
    slidingly engaging an indicia column to the indicia row such that a positioning coordinates set is defined on the merchandise display;
    sliding the indicia column relative to the indicia row to identify a positioning coordinates set corresponding to a designated product coordinates set;
    extending and retracting the indicia column relative to the indicia row;
    locating one or more products on the merchandise display at the product coordinates set;
    removing the indicia row from the merchandise display;
    moving the indicia row to a second merchandise display; and
    releasably attaching the indicia row to the second merchandise display.

2. The method of claim 1 wherein merchandise display is selected from the group consisting of merchandising panels, pegboards, perforated boards, wire grids, slatwalls, slotwalls, and display panels.

3. The method of claim 1 wherein the indicia column is substantially vertically oriented.

4. The method of claim 1 wherein the indicia row is substantially horizontally oriented.

5. The method of claim 1 further comprising the step of positioning a display support member at the product coordinates set.

6. The method of claim 5 further comprising the step of placing the product on the display support member.

7. The method of claim 1 further comprising the steps of:
    (e) moving the indicia row and the indicia column relative to the display,
    (f) providing a second product coordinates set, and
    (g) locating a second product on the display at a location corresponding to the second product coordinates set.

8. A system for facilitating the positioning of at least one salable product on a plurality of merchandise displays, the system comprising:
    (a) a plurality of merchandise displays selected from the group consisting of merchandising panels, pegboards, perforated boards, wire grids, slatwalls, slotwalls, and display panels,
    (b) a coordinate indicia row releasably attachable to and moveable between the plurality of merchandise displays, and
    (c) an indicia column including an extendable and retractable coordinate portion slidingly engaged with the indicia row,
    whereby the indicia row and the indicia column cooperate to define at least one product coordinates set at a point on the merchandise display where the product is to be positioned.

9. The system of claim 8 wherein at least one of the merchandise displays comprise a perforated board having a plurality of apertures defined therein.

10. The system of claim 8 wherein the coordinate indicia row comprises a substantially horizontally oriented horizontal member adapted to removably engage the display.

11. The system of claim 10 wherein the horizontal member includes at least one securing member affixed thereto, the at least one securing member being adapted to engage the plurality of merchandise displays.

12. The system of claim 8 wherein the coordinate indicia column is substantially vertically oriented.

13. The system of claim 8 wherein the coordinate indicia column is slidable relative to the indicia row.

14. The system of claim 8 wherein the coordinate indicia column comprises a tape measure.

15. A device for facilitating the positioning of a product on a merchandise display, the device comprising:
    (a) a first horizontal member adapted to removably attach to the merchandise display, the horizontal member including coordinate indicia thereon, and
    (b) a coordinate member slidingly engaged with the first horizontal member, wherein the coordinate member includes an extendable and retractable coordinate portion,
    whereby a coordinate from the first horizontal member and a coordinate from the coordinate member form a product coordinates set for facilitating positioning of the product on the merchandise display.

16. The device of claim 15 wherein the coordinate member is removably engageable with a plurality of merchandise displays.

17. The device of claim 15 wherein the coordinate member is affixed to a carriage, the carriage being slidable relative to the first horizontal member.

18. The device of claim 17 wherein the carriage is slidably affixed to the first horizontal member.

19. The device of claim 15 in combination with the display, wherein the display is selected from the group consisting of merchandising panels, pegboards, perforated boards, wire grids, slatwalls, slotwalls, and display panels.

20. The device of claim 15 wherein the first horizontal member has a front surface and a back surface, wherein at least one securing member is affixed to the back surface.

21. The device of claim 20 wherein the at least one securing member includes a plurality of pegs for removably engaging the merchandise display.

22. The device of claim 15 wherein the coordinate indicia comprises a first and second coordinate sets each having first and second opposite ends, wherein the first coordinate set comprises a plurality of alphabetical, numeric or alphanumeric elements that progress alphabetically, numerically or alphanumerically in a first direction from the first end to the second end, and wherein the second coordinate set comprises substantially the same elements as the first coordinate set, the elements progressing in a second direction from the first end to the second end, wherein the second direction is substantially opposite to the first direction, and wherein the first end of the first coordinate set is substantially aligned in a vertical direction with the second end of the second coordinate set.

23. The device of claim 22 wherein the first and second coordinate sets comprise alphabetical elements.

24. The device of claim 22 wherein the first and second coordinate sets comprise numerical elements.

25. The device of claim 22 wherein the first and second coordinate sets comprise alphanumeric elements.

26. The device of claim 22 further comprising a third coordinate set on the coordinate member, the third coordinate set comprising alphabetical, numeric or alphanumeric elements that progress alphabetically, numerically or alphanumerically in a third direction, wherein the third direction is substantially perpendicular to the first and second directions.

27. The device of claim 26 wherein the third coordinate set can move in the first and second directions.

28. A device for facilitating the positioning of at least one product on a merchandise display, the device comprising:

(a) a substantially horizontally oriented horizontal member including at least one coordinate indicia row, the horizontal member including at least two securing members affixed thereto, the securing members each being adapted to attach to the merchandise display, (b) a carriage slidable relative to the horizontal member, the carriage slidably engaging the horizontal member, and (c) a substantially vertically oriented extendible and retractable coordinate indicia column extending from the carriage.

29. The device of claim 28, wherein the coordinate indicia column comprises a tape measure, and wherein the carriage comprises a pair of side members that secure the tape measure in place.

30. The device of claim 29 wherein the side members each have an opening defined therein that is sized to receive the horizontal member, thereby slidably securing the tape measure to the horizontal member.

31. The device of claim 28 wherein the horizontal member includes first and second coordinate indicia rows each having first and second opposite ends, wherein the first coordinate indicia row comprises a plurality of alphabetical, numeric or alphanumeric elements that progress alphabetically, numerically or alphanumerically in a first direction from the first end to the second end, and wherein the second coordinate indicia row comprises substantially the same elements as the first coordinate set, the elements progressing in a second direction from the first end to the second end, wherein the second direction is substantially opposite to the first direction, and wherein the first end of the first coordinate set is substantially aligned in a vertical direction with the second end of the second coordinate set.

* * * * *